Jan. 5, 1960  F. A. SCHNEIDER  2,919,676
LEASH RETAINING MEANS
Filed Jan. 16, 1958
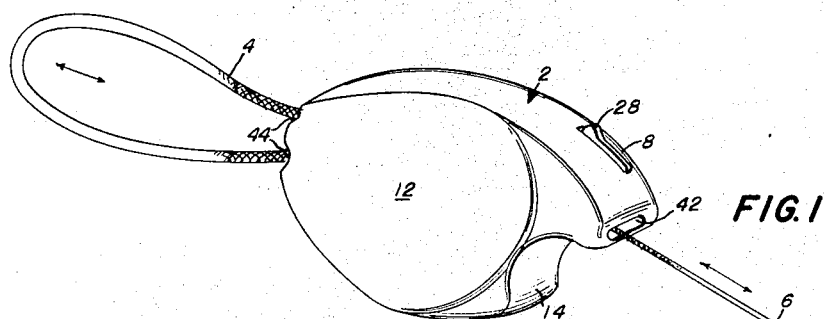
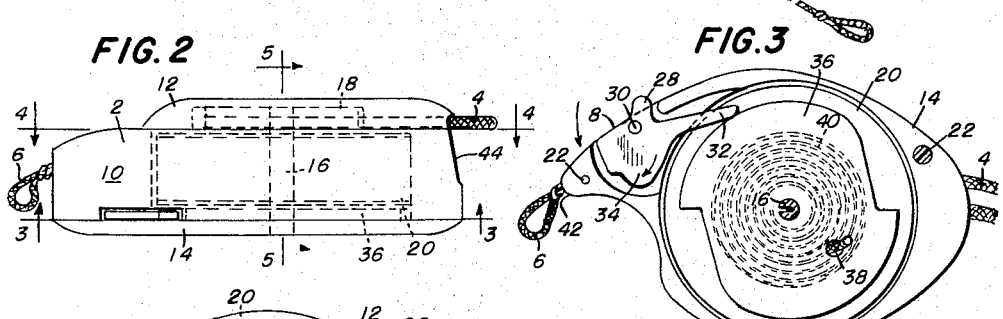
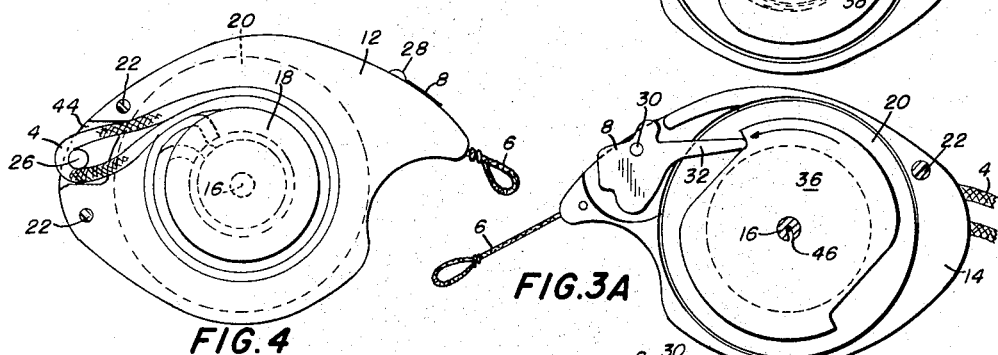
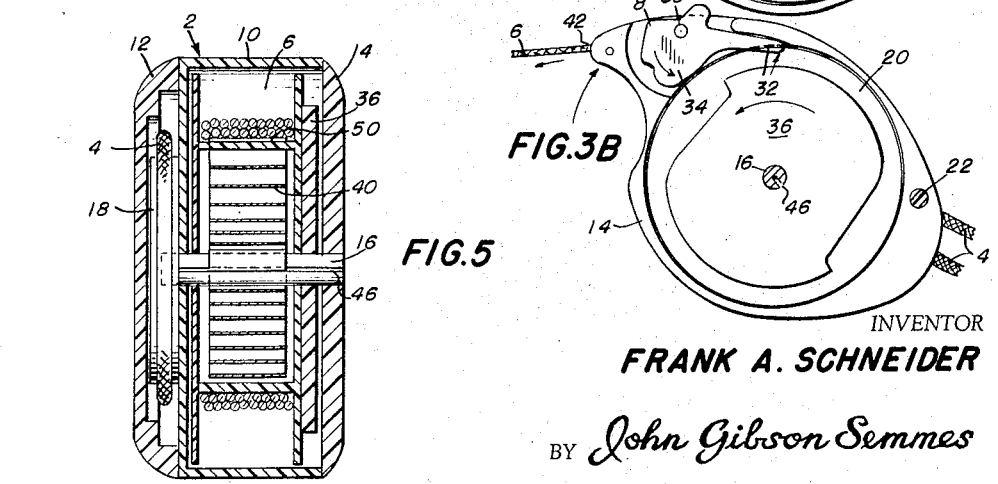
INVENTOR
FRANK A. SCHNEIDER
BY *John Gibson Semmes*
ATTORNEY

United States Patent Office 2,919,676
Patented Jan. 5, 1960

2,919,676

LEASH RETAINING MEANS

Frank A. Schneider, Texarkana, Tex.

Application January 16, 1958, Serial No. 709,230

3 Claims. (Cl. 119—109)

My invention relates to animal tethering devices, particularly dog leashes and means for retracting and retaining same without undue effort on the part of the dog handler or without discomfort to the dog.

In the prior art there are numerous examples of dog leashes providing a housing with hand grip and a dog leash reel rotatably mounted therein. Such devices have included spring means actuable with the reel to coil and retain the dog leash within the housing as well as ratchet means for manually stopping the payout of the dog leash from the reel. The principal disadvantages of these leashes have been the bulkiness of their housings and hand grips, which has prevented storage of the device on the person of the handler, and the intricacy of the ratchet means which has made difficult their effective use at the time of greatest need, viz. when the dog is straining upon the leash.

My device is unique in that it embodies a leash retracting means and a simplicity of construction which permits the entire device to be operably carried within the palm of a human hand and, as well, stored upon the person of the handler. Additionally, my device provides a unique wrist loop holding means which is retractable, as is the leash in the housing. Also, my device embodies a unique pawl-like stopper arm rotatably mounted in the housing for gravitational actuation with a leash reel ratchet means to govern the payout of the dog leash. Accordingly, the following are objects of my invention:

A principal object of invention is to provide a dog leash retainer having means for retracting a leash therein, which will fit within the palm of a human hand and which may be stored upon the person of the dog handler.

Another object is to provide a dog leash retainer which has a retractable wrist loop holder and means for coiling and retaining same within a housing.

Yet an additional object of invention is to provide a compact dog leash retainer, having leash stopper means which may be gravitationally actuated by tilting of the retainer in the hand of the dog handler.

The attached drawing illustrates a preferred embodiment of invention wherein:

Figure 1 is a perspective view of my dog leash retainer, showing the wrist loop and dog leash in partially distended position.

Figure 2 is a plan view thereof.

Figure 3 is a vertical sectional view, taken along line 3—3 of Figure 2, showing my ratchet and leash in inoperative or storing position.

Figure 3A is a vertical sectional view, taken along line 3—3 of Figure 2, and shows my unique stopper arm engaging ratchet means adjacent a side of my leash reel.

Figure 3B is a vertical section view, taken along line 3—3 of Figure 2 and illustrating my ratchet in payout position.

Figure 4 is a vertical sectional view, taken along line 4—4 of Figure 2.

Figure 5 is a vertical sectional view, taken along line 5—5 of Figure 2.

In Figure 1 my leash retainer is designated generally as 2, having mounted therein leash 6, which pays out through tangential outlet 42, and wrist loop 4 which pays out through outlet 44 (not shown). A shoulder portion 28 of my pawl-like stopper arm 8 is shown protruding through housing 2.

In Figures 2 and 4 housing 2 which may be constructed of plastic, light metal or the like is shown as having a base section 12, a box-like midsection 10 and a cover section 14. These sections may be joined together by means of pins 22, illustrated in Figures 3 and 4, or, in the case of plastic, by means of a plastic solvent cement. These pins 22 may be integrally mounted within the sides of mid section 10, and thus protrude as male members for fitting into complementary recesses in base 12 and cover 14. Rotatably mounted between the base 12 and cover 14 is spindle 16 which has a circular base 18. The shank of spindle 16 extends axially through mid section 10 and supports leash reel 20 rotatably mounted thereon. Leash 6 may be attached to reel 20 by pulling an end thereof through hole 38 and knotting. Adjacent a side of reel 20 is an elevated ratchet surface 36. Spindle 16 may be slotted as at 46 reel and 36 hub may be slotted as at 50. Interconnecting these spindle and hub slots is coil spring 40, the ends of which may be fastened in slots 46 and 50. As illustrated in Figure 3, coil spring 40 urges reel 20 counter clockwise, thus urging reel 36 to coil and retain leash 6 thereon. My stopper arm 8, which may be rotatably mounted on a pin 30 secured in a mid-section side, embodies a shoulder portion 28, and a rounded base 34 pawl-like stopper-arm 32. When my leash retainer is held normally and horizontally in the dog handler's hand, as illustrated in Figure 3 my stopper arm is balanced as in Figure 3. If my leash outlet 42 is pointed slightly downward and below horizontal, pawl 32 engages the ratchet surface 36 of reel 20 and thereby stops the payout of leash 6. Pay-out may be permitted by pointing outlet end 42 upwards and thus relieving stopper arm pawl 32 from ratchet surface 36. If desired stopper arm 8 may be manually operated by the user's thumb, without pointing downward of leash outlet 42. Preferably, my leash 6 and wrist loop 4 are woven of nylon fabric which provides the necessary durability, without occupying an undue amount of space in the reels. The housing as well as male members may be constructed of plastic and the stopper arm 8, spindle 16, spindle base 18 may be constructed of aluminum or the like.

As illustrated in Figures 4 and 5 spindle base 18 may have circumferentially attached thereto wrist loop 4. This wrist loop may extend through wrist outlet 44 and around stop guard 26, which protrudes from the mid section 10. Inasmuch as spindle 16 is rotatably mounted, coil spring 40 urges clockwise spindle 16 and base 18 to retract and coil wrist loop 4 thereon.

As may be seen from the foregoing, I have provided a leash retainer which embodies a retractable wrist loop and leash and a manually and gravitationally actuable ratchet. This compact retainer is configured to fit the palm of the human hand and because of its diminutive size may be easily carried in the pocket or handbag of the dog handler.

The specific features of a preferred embodiment of invention having been illustrated and described, it will be apparent that modifications may be employed without departing from the scope of invention which I claim as follows.

1. A coiler having an upstanding spindle, rotatably mounted between a base and cover of said coiler, a reel rotatably mounted on said spindle with ratchet means adjacent one side of the reel, a coil spring interconnecting said spindle and a hub of said reel and urging said reel to coil and retain thereon a line affixed thereto and a gravitationally actuated pawl-like arm rotatably mounted and adjustable to and in axial parallelism with said reel between said base and said cover, and engaging said ratchet means.

2. A coiler as claimed in claim 1, said spindle having a reel-like base and a holding line affixed thereto, said spindle and said base being urged by said coil spring in an opposite direction from said reel.

3. An animal leash retainer comprising a housing composed of interlocking base, midsection and cover members, a longitudinally disposed spindle rotatably mounted between said base and cover and extending axially through said mid section, a reel rotatably mounted on said spindle within said housing and having ratchet means adjacent a side, thereof, a coil spring interconnecting said spindle and a hub of said reel, said coil spring urging said reel to retain a leash wound thereon, a pawl-like stopper arm rotatably mounted in said housing and being gravitationally actuable to engage said ratchet means and thereby govern the payout of a leash, said spindle having auxiliary reel means fixed to its base mounted end, said spindle and said auxiliary reel means being urged by said coil spring to wind and retain a wrist-holding cord encircled thereon.

References Cited in the file of this patent

UNITED STATES PATENTS

| D. 125,944 | Stickell | Mar. 18, 1941 |
| 2,217,323 | Sackett | Oct. 8, 1940 |
| 2,314,504 | Lifchultz | Mar. 23, 1943 |

FOREIGN PATENTS

| 293,374 | Switzerland | Sept. 30, 1953 |